March 2, 1965   M. L. BENJAMIN ET AL   3,171,664
CHUCK
Filed Dec. 14, 1962

INVENTORS
MILTON L. BENJAMIN &
GEORGE FREI
BY
Oberlin, Maky & Donnelly
ATTORNEYS

United States Patent Office 3,171,664
Patented Mar. 2, 1965

3,171,664
CHUCK
Milton L. Benjamin, Shaker Heights, and George Frei, Brecksville, Ohio, assignors to Erickson Tool Company, Solon, Ohio, a corporation of Ohio
Filed Dec. 14, 1962, Ser. No. 244,783
4 Claims. (Cl. 279—50)

The present invention relates generally as indicated to a chuck and more particularly to a high speed dental chuck.

It is a principal object of this invention to provide a chuck of the character indicated which is operative to firmly grip the shank of a tool such as a dentist's drill, for example, and which is easy to operate for gripping and releasing the tool.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

Figure 1:
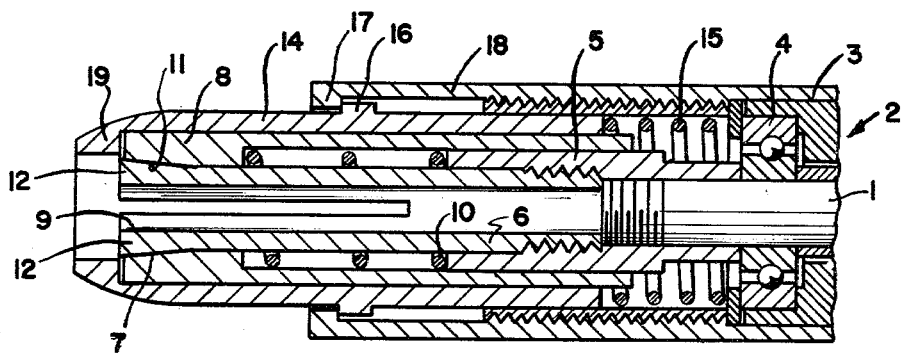
Figure 2:
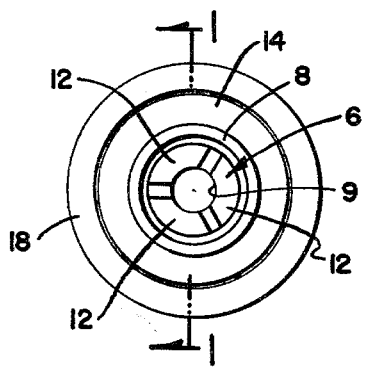

In said annexed drawing:

FIG. 1 is a fragmentary longitudinal cross-section view (along line 1—1, FIG. 2) of a chuck embodying the present invention; and FIG. 2 is an end elevation view of the chuck herein as viewed from the left-hand end of FIG. 1.

Referring now more particularly to the drawing, the reference numeral 1 denotes the high speed drive shaft of a pneumatic or like motor 2, the housing 3 of which carries suitable antifriction bearings 4 for journalling said drive shaft 1. Screwed onto the drive shaft 1 is the holder 5 into which, in turn, the collet 6 is threaded at one end. The other end of the collet 6 is axially slotted and has a tapered outer face 7 with which the collet actuator 8 is engaged to contract that end of the collet upon the shank of a tool (not shown) which is adapted to be inserted in the bore 9 of the collet 6.

The collet actuator 8 is axially reciprocably slidable on collet 6 and collet holder 5 and is biased by spring 10 to a position tending to close the collet 6 upon the shank of the tool. The collet 6 is made of spring metal and when the collet actuator 8 is retracted toward the right as viewed in FIG. 1, its tapered bore 11 disengages from the tapered end 7 of the collet, whereby the collet fingers 12 are free to move radially outward to a position releasing the grip on the tool shank.

Disposed around the rotating collet holder 5 and collet actuator 8 is a sleeve member 14 which normally is biased to the left by the spring 15 with its collar 16 engaging the inturned shoulder 17 of the housing 18 and in that position, and with the collet 6 closed onto the tool, there is preferably a slight clearance, as shown, between the end of the collet actuator 8 and the inturned shoulder 19 at the end of the sleeve 14, whereby said sleeve 14 does not rotate when the chuck is in use.

When it is desired to remove or insert a tool into the chuck, the operator merely pushes the projecting end of the sleeve 14 toward the right against the spring 15, whereupon the inturned shoulder 19 thereof engages the end of the collet actuator 8 and pushes the latter toward the right against spring 10 to disengage the tapered bore 11 from the tapered outer surface 7 of the collet 6. The collet fingers 12 then are free to spring radially apart for easy withdrawal or insertion of a tool. When pressure on the sleeve 14 is released, the spring 15 moves the sleeve 14 to the position shown with collar 16 engaged with shoulder 17 and the spring 10 urges the collet actuator 8 to the left into engagement with the tapered end 7 of the collet 6 for contracting the fingers 12 of the latter.

Other modes of applying the principle of the invention may be employed, change being made as regards the details described, provided the features stated in any of the following claims, or the equivalent of such, be employed.

We therefore particularly point out and distinctly claim as our invention:

1. A dental chuck and the like comprising a housing; a drive shaft journalled in said housing; a collet holder mounted on said drive shaft for rotation therewith; a collet secured at one end to said holder and being slotted at the other end for radial contraction and expansion; a collet actuator axially reciprocable on said holder and coacting with said collet for radial contraction and expansion thereof; and a sleeve surrounding said collet actuator by which said chuck is adapted to be held; said sleeve having frictional engagement with said housing for rotation of said shaft, holder, collet, and actuator therewithin.

2. The chuck of claim 1 wherein spring means between said holder and actuator biases the latter in a direction to effect contraction of said collet.

3. The chuck of claim 2 wherein said sleeve is axially movable in said housing and has an inturned shoulder for engaging said actuator to move it against said spring means for expansion of said collet.

4. The chuck of claim 3 further including a second spring means contacting said sleeve for biasing the latter away from said actuator and into frictional engagement with said housing.

References Cited by the Examiner
UNITED STATES PATENTS 2,016,766 10/35 Blair.
2,477,773 8/49 Soussloff _____ 279—50
2,655,826 10/53 Goldsby _____ 279—50

FOREIGN PATENTS 510,876 1/55 Italy.

FRANK SUSKO, *Primary Examiner.*